April 14, 1925.
H. W. LIVERMORE
1,533,874
ELECTRIC ARC WELDING AND PREHEATING HANDLE
Filed Dec. 30, 1921
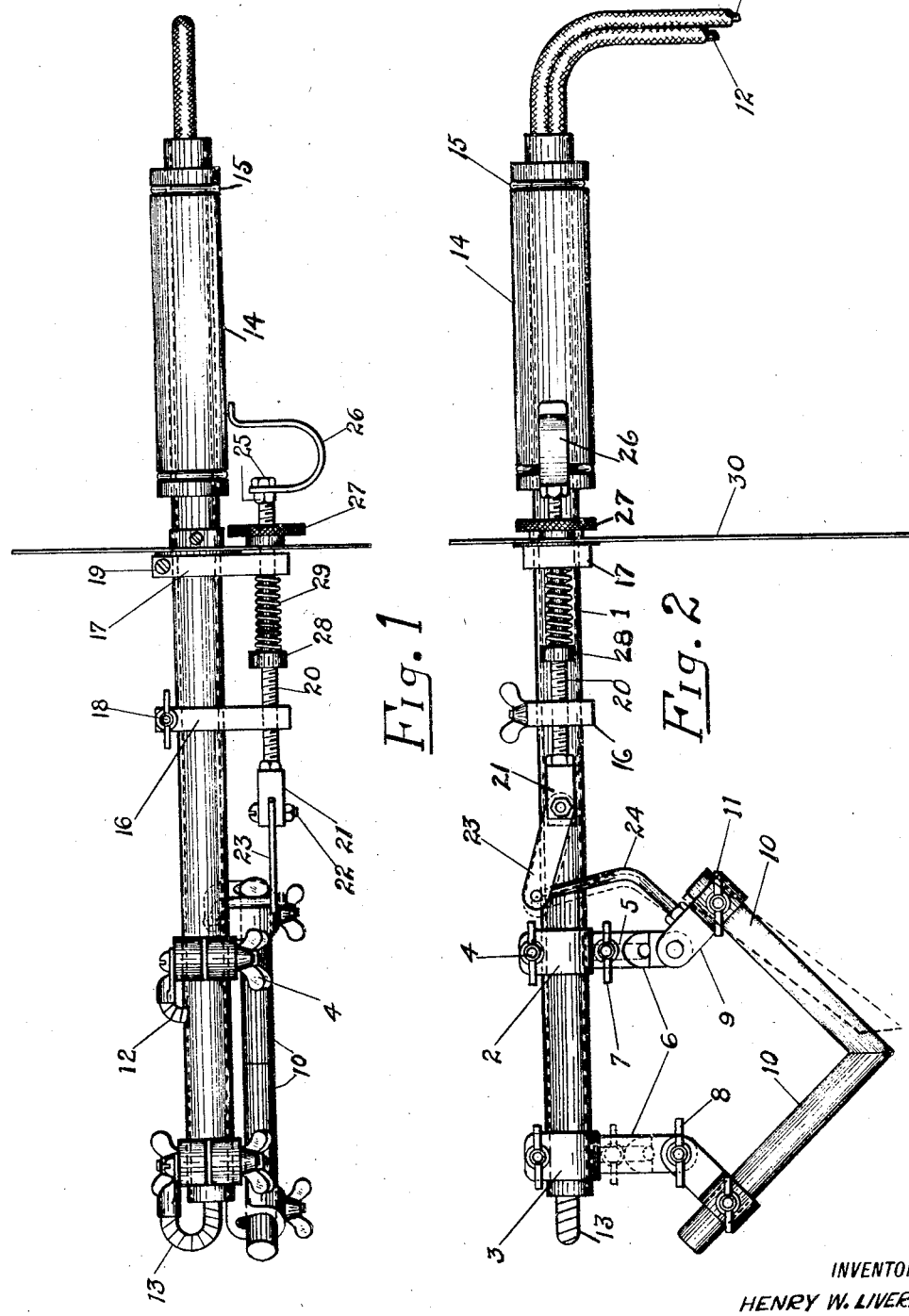
INVENTOR
HENRY W. LIVERMORE
BY
A. D. T. Libby
ATTORNEY Patented Apr. 14, 1925.

1,533,874

UNITED STATES PATENT OFFICE.

HENRY W. LIVERMORE, OF EAST ORANGE, NEW JERSEY, ASSIGNOR TO ELECTRIC ARC CUTTING & WELDING COMPANY, OF NEW YORK, N. Y.

ELECTRIC-ARC WELDING AND PREHEATING HANDLE.

Application filed December 30, 1921. Serial No. 525,984.

*To all whom it may concern:*

Be it known that I, HENRY W. LIVERMORE, a citizen of the United States, residing at East Orange, in the county of Essex, State of New Jersey, have invented certain new and useful Improvements in Electric-Arc Welding and Preheating Handles, of which the following is a description, reference being had to the accompanying drawing and to the figures of reference marked thereon.

This invention relates to a handle suitable for electric arc welding or preheating where carbon electrodes are used. In certain classes of work the double carbon arc may be used to better advantage than the metallic arc; that is to say, an arc in which the work is one of the electrodes and the other a metallic rod held in the holder, the rod being fed automatically or manually. It also happens many times in welding cast iron, that it is necessary to preheat the work in order to reduce the effects of strains set up in the work by the localized heating which results when the weld is made or, in the case of a hole in the casting, when this hole is filled up, by metal from a metallic electrode or from an electrode melting down under the heat of the carbon arc.

My improved handle is particularly adapted for this work of preheating, as will be further described herein. In addition to its use for preheating, the double carbon arc may be used for welding very thin sections of metal, since the arc may be caused to "play" on the work in the same manner as an acetylene flame, and a rod melted down into the work in the well-known manner of double carbon arc welding.

Other uses will be apparent to one skilled in the art after a study of the annexed specification and drawings, in which—

Figure 1 is a plan view of the handle, and
Figure 2 is a side elevation of Figure 1.

Referring now to the details wherein like numbers refer to corresponding parts in the two views, 1 is a hollow tube, preferably of any suitable insulating material, on one end of which is fastened clamps 2 and 3 by suitable means, such as clamping bolts 4, whereby the clamps 2 and 3 may have a certain relative adjustment on the tube 1. The lower portion of the clamps 2 and 3 terminate in projections 5 that are adapted to enter a socket in a connector 6, a clamping screw 7 holding the connector 6 to the projection 5. Fastened to the outer end of the connector 6 by means of a clamping screw 8 is a holder 9, which in turn carries a carbon electrode 10, the same being adjustably carried in the holder 9 by clamping screw 11. From the above description it is seen that the holder 9 is adjustable on the connector 6 and that the connector 6 has a certain adjustment in and out on the extension 5, while the clamps 2 and 3 have some adjustment on the tube 1. These adjustments allow the carbon 10 to be placed at any desired angle and also to take up for the burning away of the carbon under the heat of the arc.

Cables 12 and 13 are adapted to pass through the hollow tube 1 and one of these, 12 for example, comes out of the tube at the proper place through a suitable slot in the tube 1, and fastens to the clamp 2. The other cable 13 comes out of the end of the tube and fastens to clamp 3. it being understood that a certain amount of slack is left in the cables 12 and 13 where they come out of the tube 1 to provide a small amount of relative movement of the clamps 2 and 3.

On the end of the tube, opposite from the carbons, is secured a handle 14, preferably of insulating material and also preferably made in two portions, which are held together with spring snap rings 15. Two guide members 16 and 17 are carried on the tube 1 intermediate the clamp 2 and the handle 14. These guide members have a relative adjustment on the tube 1 by means of the clamping screws 18 and 19. These guide members are for the purpose of supporting and guiding a rod 20, to one end of which is fastened a clevis 21. Pivotally mounted on the stud 22 which passes through the clevis 21 is a link 23, preferably made of suitable insulating material. It is understood that the link 23 may be of metal, but insulated at either one end or the other by suitable insulating bushings, the idea being to insulate the hook 26 and the adjusting nut 27 from the electrical circuit. The link 23 is pivotally connected through the medium of a rod 24 with the rear holder 9. To the other end of the rod 20 is fastened in any suitable manner, such as clamping nuts 25, a hook or trigger 26. As shown, the rod 20 is threaded through its length and carries a nut 27, to the rear of the support 17 and a stop collar between the supports 16 and 17. A spring 29 is positioned on the rod 20 between the collar 28 and the member 17 and as shown, is under compression for the purpose which will be later explained.

In order to keep the heat of the arc away from the hand of the operator, I prefer to use a shield 30, which may be of any suitable material.

Normally the spring 29 holds the collar 28 against the guide or support member 16, holding the rear carbon 10 in position the same as shown in dotted lines; that is to say, in a position whereby the current will pass from one carbon to the other forming an arc. As the carbon burns away there may come a time when the arc will go out and is is necessary to strike the arc or in starting up, the carbons must be brought together in order to start the arc. The arc is started by means of pulling on the hook 26, thereby compressing the spring 29 and bringing the two carbons together as shown in Fig. 2. On releasing the pressure on the hook 26, the spring 29 carries the rod 20 back so that the collar 28 comes against the stop 16, separating the carbons and striking the arc as explained.

It will be noted that the hook 26 is placed immediately adjacent the handle so that the operator readily engages this with his finger or thumb at the same time manipulating the handle.

I have so proportioned the parts and arranged them on the tube 1 so that when the cables 12 and 13 are connected as shown, and allowing for the usual amount of weight from the cables 12 and 13 hanging down from the handle, the center of gravity comes within the area of the handle, whereby a well-balanced piece of apparatus is secured. That is to say, the balance is such in the operator's hand as to allow him to operate the handle without tiring his hand.

While the tube 1 may be made of some insulating material which might warp a certain amount under the heat of the arc, the adjustments I have provided will amply take care of this condition. It will be understood that a metal tube may be used inside of the insulating tube in order to prevent warping and to add strength, although for all practical purposes, I find that a tube of suitable insulating material is sufficient.

It will further be noted that I have preferably made link 23 of insulating material so that the operator's hand will not be connected with any live portion of the electrodes when manipulating the handle in actual work.

It is to be understood that when adjustments of the carbons or the other parts of the handle are necessary, other than the adjustment on the nut 27 which is as has been explained for the purpose of fixing the length of the arc, a control switch in leads 12 and 13 may be opened.

It will be apparent to one skilled in the art, that many changes may be made in the details of my invention without departing from the spirit thereof and the scope of the appended claims.

Having thus described my invention, what I claim is:

1. In a device of the class described, a one-piece longitudinal frame member adapted to carry cables substantially from end to end, clamps carried on one end of said member in insulated spaced relationship, holders adjustably carried by said clamps and supporting arc electrodes, fastening means on said clamps for receiving said electric current cables and means for striking an arc between said electrodes.

2. In a device of the class described, in combination; a continuous hollow tube, clamps carried on one end of said tube in insulated spaced relationship, holders adjustably carried by said clamps and supporting arc electrodes, electric current cables passing through said tube and emerging therefrom near their respective clamps, means for fastening said cables to said clamps and means carried by the tube and having a part extending in close proximity to the handle for moving one of the holders and its electrode to strike an arc.

3. In a device of the class described, a tubular frame member of insulating material for carrying substantially from end to end conductor cables, metallic clamps carried on one end of said frame member in spaced relationship, arc electrode holders connected to said clamps, means on said clamps for attaching said conductor cables thereto, a handle portion on the other end of said frame member, a pull rod supported at a plurality of points by said frame member and having a hook adjacent said handle and a link connecting said pull rod on one of said holders for the purpose described.

4. In a device of the class described, a tubular frame member of insulating material for carrying substantially from end to end conductor cables, metallic clamps carried on one end of said frame member in spaced relationship, arc electrode holders connected to said clamps, means on said clamps for attaching said conductor cables thereto, a handle portion on the other end of said frame member, a pull rod supported at two points by said frame member and having a hook adjacent said handle and a link of insulating material connecting said pull rod to the rear one of said holders for the purpose described.

5. In a device of the class described, a tubular frame member of insulating material, metallic clamps carried on one end of said frame member in spaced relationship, arc electrode holders connected to said clamps, means on said clamps for attaching conductor cables thereto, a handle portion on the other end of said frame member, guide supports in spaced relationship on the frame member between the handle and rear clamp, a pull rod carried by said supports and having a hook adjacent said handle, a link of insulating material connecting said rod to the rear one of said electrode holders, a spring associated with said rod for returning the same to normal position after having been operated by said hook and means for adjusting the operative movement of said rod.

6. In a device of the class described, a tubular frame member of insulating material, metallic clamps carried on one end of said frame member in spaced relationship, arc electrode holders connected to said clamps, means on said clamps for attaching conductor cables thereto, a handle portion on the other end of said frame member, guide supports in spaced relationship on the frame member between the handle and rear clamp, a pull rod carried by said supports and having a hook adjacent said handle, a link of insulating material connecting said rod to the rear one of said electrode holders, a spring associated with said rod for returning the same to normal position after having been operated by said hook, means for adjusting the operative movement of said rod, and a shield carried by the frame member adjacent said handle.

7. In a device of the class described, a hollow insulating tube adapted to have electric cables pass therethrough, clamps carried on one end of the tube in spaced relationship, holders adjustably carried by the clamps, arc electrodes adjustably carried in said holders, a handle on the end of the tube opposite to said clamps, means including an insulating link carried by the tube and having a part extending in close proximity to the handle for moving the rear one of said holders and its electrode into contact with the other electrode, automatic means for separating said electrodes and means associated with the moving means for adjusting the amount of separation of said electrodes.

8. In a device of the class described, a hollow tube for the reception of electric cables, a handle on the cable entering end of the tube, clamps carried on the other end of the tube, but electrically insulated from each other, with means for fastening the cables thereto, electrode holders attached to said clamps, means carried by the tube and terminating adjacent the handle for actuating the rear electrode holder to strike an arc, said parts being so arranged as to bring the center of balance within the space occupied by the handle as described.

In testimony whereof, I affix my signature.

HENRY W. LIVERMORE.